UNITED STATES PATENT OFFICE.

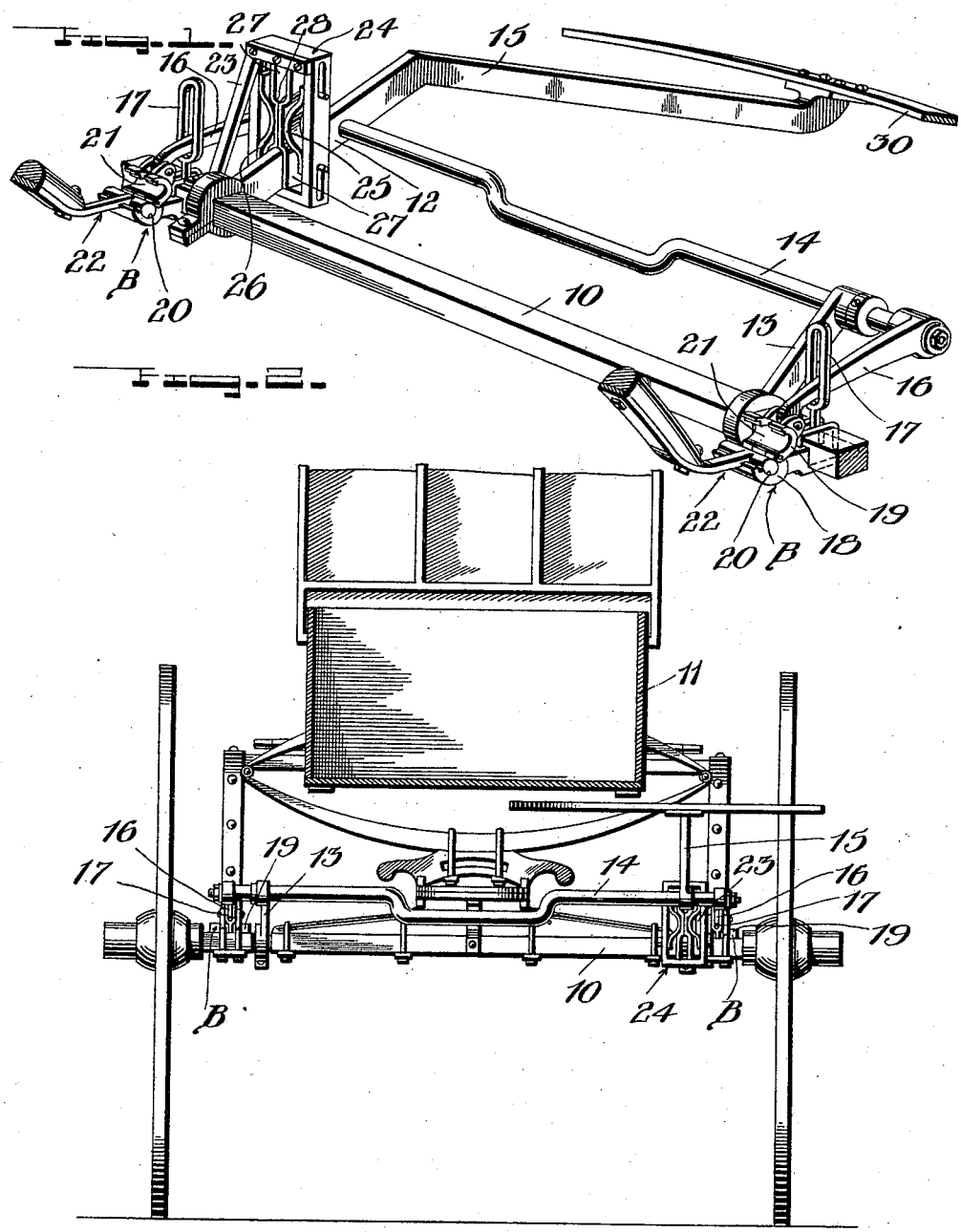

THOMAS E. VILVEN, OF EUCLID, MINNESOTA.

HORSE-RELEASER.

1,046,040.

Specification of Letters Patent. Patented Dec. 3, 1912.

Application filed December 21, 1911. Serial No. 667,166.

*To all whom it may concern:*

Be it known that I, THOMAS E. VILVEN, a citizen of the United States, residing at Euclid, in the county of Polk, State of Minnesota, have invented certain new and useful Improvements in Horse-Releasers; and I do hereby declare the following to be a full, clear, and exact description of the invention, such as will enable others skilled in the art to which it appertains to make and use the same.

This invention relates to horse releasers.

The object of the invention resides in the provision of a horse releaser which is adapted to detachably secure the thills to the front axle of a vehicle, and which may be operated to release the thills from the front axle when the draft animal becomes unruly.

With the above and other objects in view, the invention consists in the details of construction and in the arrangement and combination of parts to be hereinafter more fully described and particularly pointed out in the appended claims.

In describing the invention in detail, reference will be had to the accompanying drawings, wherein like characters of reference denote corresponding parts in the several views, and in which—

Figure 1, a perspective view of the forward axle of a vehicle and of the invention applied thereto, the latter being shown in release position, and Fig. 2, a transverse section through the vehicle looking at the forward axle and showing the invention applied.

Referring to the drawings 10 indicates the front axle of a vehicle and 11 the vehicle body. Pivotally mounted upon the front axle 10 is a pair of spaced arms 12 and 13, the free ends of which are connected by a cross member 14. The arm 12 is extended as at 15 to form an operating handle as will hereinafter appear. The ends of the cross member 14 are also extended beyond respective arms 12 and 13 and mounted on these extensions of the cross member 14 are corresponding forwardly projecting fingers 16 respectively. These fingers 16 project through slotted guide members 17 mounted upon the axle 10 and extend upwardly from the latter. The thill keepers are indicated at B and it is shown as comprising a section 18 fixed to the axle 10 and a section 19 hinged to the section 18 and disposed above the latter. These sections 18 and 19 are provided respectively with opposed grooves 20 and 21 in which are adapted to be secured the T-end of thills 22. The section 19 of each thill keeper is pivotally connected to the free end of the adjacent finger 16. By this construction it will be apparent that as the arms 12 and 13 are oscillated upon the axle 10 through the medium of the extension 15 the sections 19 of the thill keepers will be moved to and from locking position with respect to the sections 18 of said keepers.

In order to lock the arm 12 so as to hold the sections 19 of the thill keepers either in locking or release position as may be desired there is mounted on the axle 10 adjacent the arm 12 a laterally disposed arm 23 which carries at its outer end a frame 24 and between the sides of which latter the arm 12 is disposed. Mounted upon the sides of the frame 24 are oppositely disposed leaf springs 25 and 26 each of which carries a face plate 27 and these face plates have their terminals curved away from each other as at 28 to form sockets for receiving and locking the arm 12 in its extreme positions. It will be apparent that the shifting of the arm 12 from one extreme position to the other can be accomplished by applying sufficient force thereto to effect the necessary compression of the springs 25 and 26 so as to permit the passage of the extension 15 of said arm between the face plates 27.

In order to provide for operating the hinged sections 19 of the keepers to release position by an occupant of the vehicle the free end of the extension 15 is provided with a pedal 30 disposed at all times either partly to one side of the vehicle whereby the arm 12 may be operated by the foot or hand of the occupant of the vehicle when desired to move the sections 19 of the thill keepers to release position.

What is claimed is:

1. In a horse releaser, the combination with the front axle of a vehicle, of thill keepers mounted on said axle, each of said thill keepers comprising a section fixed to the axle and a second section hinged to the first named section for movement to and from locking position with respect to the first named section, a frame pivoted on said axle, and including spaced side members, fingers secured to said side members respectively and connected to the hinged sections of respective keepers whereby the movement of the frame will move said hinged sections to and from locking position, and means for locking said frame against movement for maintaining the hinged sections of the keepers in locking or released position.

2. In a locking device for horse releasers, the combination with the front axle of a vehicle and releasable thill keepers mounted on the axle, of an arm pivoted on the axle and operatively connected to the thill keepers, a frame supported on the axle through which the arm projects, opposed leaf springs mounted in said frame, and face plates carried by each leaf spring between which the arm pivoted on the axle is adapted to pass, said face plates having their terminals curved away from each other to form sockets for the reception of said arm in the locked and unlocked status of said keepers.

In testimony whereof, I affix by signature, in presence of two witnesses.

THOMAS E. VILVEN.

Witnesses:
KATHARINE M. BURNS,
CLARE CHAPIN.

Copies of this patent may be obtained for five cents each, by addressing the "Commissioner of Patents, Washington, D. C."